United States Patent Office 3,113,313
Patented Dec. 3, 1963

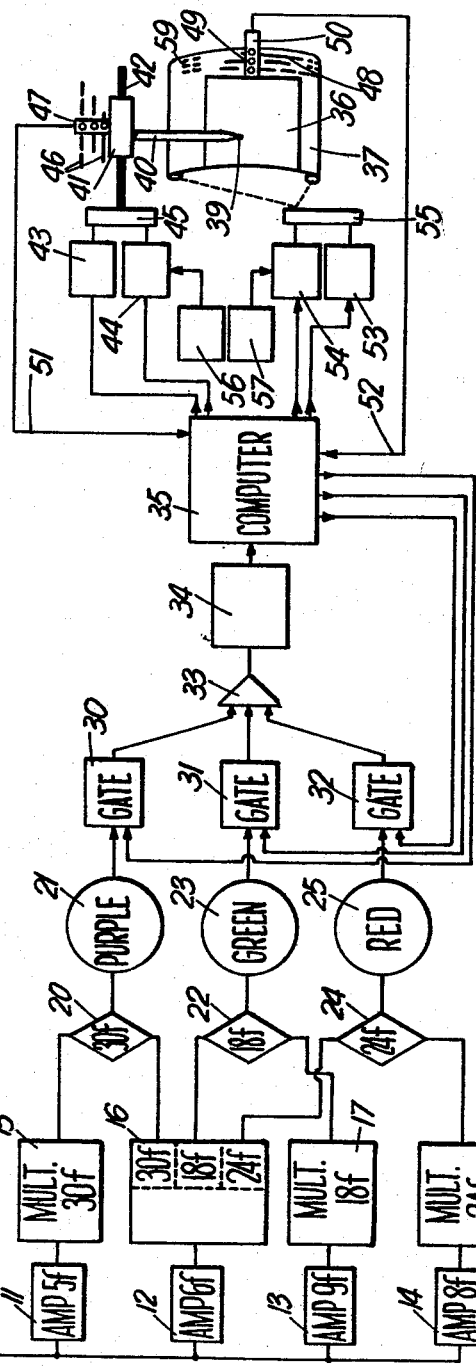

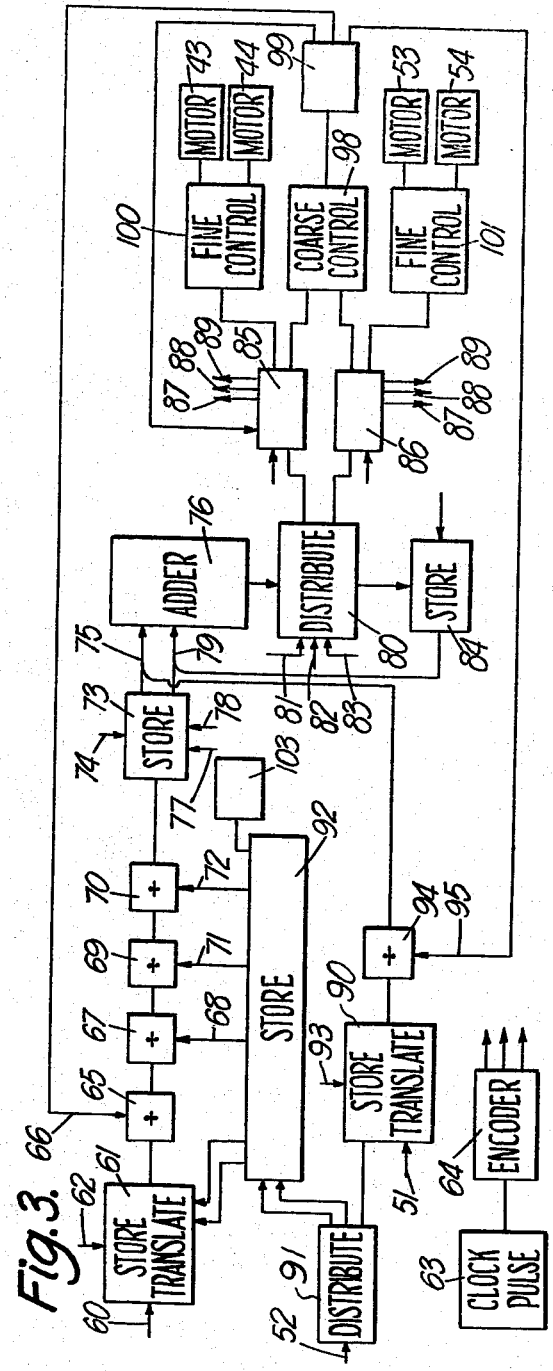

3,113,313
CHART POSITION DISPLAY APPARATUS
Graham Estyn Roberts, London, England, assignor to Decca Limited, a British company
Filed Nov. 9, 1961, Ser. No. 151,399
Claims priority, application Great Britain July 6, 1961
5 Claims. (Cl. 343—105)

This invention relates to chart position display apparatus such as may be used with radio position finding apparatus, for example a hyperbolic navigation system of the kind having a common master station with two or more slave stations and for converting information representative of the position of the craft with respect to two or more sets of confocal hyperbolae into cartesian co-ordinates. Hyperbolic navigation systems are widely used for many reasons but it is not possible to correlate information from such systems with other navigational position information except by plotting on a chart or by converting co-ordinates, e.g. by converting the hyperbolic system information into cartesian co-ordinates.

According to this invention chart position display apparatus comprises an indicator movable with respect to a chart in two co-ordinate directions, sensing means and co-operating markings for each of the two co-ordinate directions arranged on members relatively movable only in the appropriate co-ordinate direction in accordance with the movement of the indicator with respect to the chart, the markings representing, for any given position of the indication on the chart, the appropriate co-ordinates of that point in digital form and the sensing means being arranged to provide, in response to the markings, electrical signals representing the co-ordinates of the position of the indicator with respect to the chart, comparison means for comparing the output of the two sensing means respectively with input signals representing in digital form the co-ordinates of the required position of the indicator relative to the chart, and servo-means under the control of said comparison means for effecting relative movement of the indicator with respect to the chart to bring the indicator to a position on the chart corresponding to the co-ordinates represented by said input signals. For any one position of the indicator on the chart the sensing means will sense the digital markings corresponding to the co-ordinates of that position and these will be compared with the required position of the indicator and the indicator moved in accordance with the comparison. With this construction the indicator, which may be a stylus arranged to record on the chart, is automatically set into the required position provided it is near enough to the required position within limits defined by the repetition cycle of the digital markings. These limits however may be such as to define the position unambiguously over the whole of the chart area so that, wherever the indicator is put, it will move to the correct position.

Typically the digital markings would be arranged to give steps of movement which are so small that they are barely perceptible, for example steps of the order of 1/60 of an inch. The size of step is the physical significance of the least significant digit in the markings. The number of digits in each marking would determine the repetition cycle of the digital information and typically nine digits might be employed giving a repetition cycle of 512 steps so that if the steps are 1/60 of an inch, the position is defined unambiguously for a chart of just over 8 inches square.

The aforementioned sensing means conveniently are, for one or each co-ordinate direction, photo-electric sensing means having a plurality of photo-cells coresponding respectively with a series of markings representing the various digits of the co-ordinate value. Fo reach co-ordinate direction the various markings for each co-ordinate value may be arranged in a line transverse to the direction of movement of the sensing means with respect to the markings and the successive markings for different co-ordinate values may be arranged in the direction of movement of the sensing means with respect to the markings. The markings may conveniently be arranged to represent co-ordinate values in a cyclic permuting binary code such as a Gray code.

Very conveniently the chart is mounted for linear movement in one direction in a fixed housing and the indicator is mounted in the housing for linear movement in a transverse direction. In such a construction the markings for the co-ordinate direction in which the chart is moved may conveniently be on the chart with co-operating sensing means fixed in said housing. The markings for the co-ordinate direction in which the indicator is moved may be on a fixed part of the apparatus with the co-operating sensing means movable with the indicator.

A series of separate charts may be arranged in a long strip carried on rollers and such an arrangement markings may be provided on the strip between successive charts to co-operate with the sensing means sensing the position of the chart strip, which markings include control markings arranged, as the chart strip is fed under the sensing means to bring a selected chart to position, to set into the servo means data relating to the selected chart about to be moved into position.

As previously mentioned the chart position display apparatus of the present invention may be used with a hyperbolic navigation system. In such a system the input information from the radio navigation apparatus is representative of the position of a craft with respect to two or more sets of confocal hyperbolae. The chart position display apparatus of the present invention most conveniently employs a rectangular cartesian co-ordinate system and conveniently therefore means are provided for converting the information with respect to the hyperbolic position lines into rectangular cartesian co-ordinates or into approximate rectangular cartesian co-ordinates so as to avoid unnecessary distortion of the geographical chart position information. The hyperbolic positional co-ordinates may be converted into approximate rectangular cartesian co-ordinates by computing means combining, for each of the two chart co-ordinate directions, input information representative of two hyperbolic co-ordinates in proportions selected according to the form of the hyperbolic lattice pattern in the region covered by the chart. For large scale charts a good approximation of a rectangular cartesian co-ordinate system may be obtained in this way covering the whole area of the chart using the same conversion factors over the whole chart and the aforementioned control markings on the chart strip between the charts may be arranged to carry the necessary information for controlling the computing means for effecting the conversion into rectangular cartesian co-ordinates.

The following is a description of one embodiment of the invention, reference being made to the accompanying drawings in which:

FIGURE 1 is a plan view illustrating the position of transmitting stations in a hyperbolic navigation system;

FIGURE 2 is a block diagram illustrating chart display apparatus to be carried on a vehicle for use with the transmitting stations of FIGURE 1 to give an automatic chart position display; and FIGURE 3 is a block diagram illustrating in further detail part of the apparatus in FIGURE 2.

The navigational computing apparatus to be described hereinafter is arranged particularly for use with a hyperbolic navigation system having a master station and three slave stations, which slave stations for convenience are referred to as the red, green and purple slaves. The four transmitting stations are spaced apart and would generally be arranged in a star shaped pattern as shown in FIGURE 1 with the master M near the centre of the pattern and the red, green and purple slaves R, G and P disposed around the master. For the purposes of the present invention it may be assumed that these stations transmit continuous radio frequency signals. In the particular embodiment to be described, the master station transmits signals at a frequency $6f$ where $f$ is a fundamental frequency of the system and the red, green and purple slave stations transmit signals at frequencies $8f$, $9f$ and $5f$ respectively. The slave signals are locked in phase to the master signals so that by measurement of the phase relationship at a mobile receiver of signals received from the master and a slave station, a position line through the position of the receiver is determined. The position line is one of a set of confocal hyperbolae having the master and slave stations as foci. By using the master and two slave stations, two intersecting hyperbolic position lines are obtained, thereby defining the location of the receiver. The phase differences which thus determine the location of the receiver are thus referred to as hyperbolic co-ordinates.

In a mobile receiver, as shown in FIGURE 2, to determine the hyperbolic co-ordinates the signals are picked up by an aerial 10 and are amplified by amplifiers 11 to 14 tuned respectively to the frequencies $5f$, $6f$, $9f$ and $8f$. The outputs of the amplifiers are fed to frequency multipliers 15 to 18. The frequency multiplier 16 associated with the $6f$ signal from the master station separately multiplies the received $6f$ signal by factors of 3, 4 and 5 to provide outputs of $18f$, $24f$ and $30f$. The $30f$ output from the multiplier 16 is fed to one input of a phase discriminator 20 to the other input of which is fed a $30f$ output from the multiplier 15 which multiplies the received purple slave $5f$ signal by a factor of 6. The discriminator 20 provides an output which is representative of the phase relationship between the master and purple slave signals at the receiver. This output is used to drive mechanically a phase indicator and digit discs assembly 21. This phase indicator visually indicates the phase relationship for checking purposes. The digit discs provide a digital output in a Gray code representative of the phase relation between the $30f$ outputs from the multipliers 15 and 16, i.e. the master-purple slave hyperbolic co-ordinate. The $18f$ output from the multiplier 16 is fed to one input of a discriminator 22 to the other input of which is fed an $18f$ output from the multiplier 17 which multiplies the received $9f$ green slave signal by a factor of 2. The discriminator 22 drives an indicator and digit dics 23, the digit discs thereby giving an output in digital form in a Gray code representative of the phase difference between the $18f$ signals from the multipliers 16 and 17, i.e. the master-green slave hyperbolic co-ordinate. A $24f$ output from the multiplier 18, which multiplies the frequency of the received red slave signals by a factor of 3, is fed to one input of a discriminator 24 to the other input of which is fed the $24f$ output from the multiplier 16. The discriminator 24 drives an indicator and digit discs 25 to provide an output in digital form in a Gray code representative of the phase difference between the $24f$ signals from the multipliers 16 and 18, i.e. the master-red slave hyperbolic co-ordinate.

A hyperbolic phase comparison navigation system of the above kind is, with the exception of the provision of digit discs, more fully described in the specification of United States Patent No. 2,530,903 and reference may be made to that specification for further explanation of the construction and manner of operation of such a system. The indicators 21, 23 and 25 provide indications with respect to three sets of confocal hyperbolae each set having a master station and the appropriate slave station as the two foci. The positional information in digital form from the indicators and digit discs 21, 23 and 25 is fed through gates 30, 31, 32, which are controlled as hereinafter described to feed only one particular output at a time, and the information from the gates 30, 31, 32 is then fed through a gate 33 to a Gray to binary information converter 34. The converter 34 gives the hyperbolic positional co-ordinates in binary form and this information is fed into a digital computer 35 for providing outputs in approximate cartesian co-ordinates.

In the arrangement illustrated in FIGURE 2 there is provided a chart 36 which is one of a series of charts on a long strip 37 carried on rollers 38. An indicating stylus is illustrated diagrammatically at 39. This stylus in practice may be arranged underneath the chart and have a solenoid or the like to press the stylus against the chart to make a mark thereon. The stylus may be an ink stylus or it may, for example, press a marking ribbon similar to a typewriting ribbon against the chart. The stylus 39 is carried on an arm 40 mounted on a carriage 41 which is traversed by means of a lead screw 42. This lead screw is driven by one or other of two direct current electric motors 43, 44, the motor 43 being geared for slow speed operation to provide the drive to the lead screw 42 when the stylus is following the movements of the aircraft and the motor 44 being geared for fast operation for initial coarse setting. The two motors 43, 44 are coupled to drive the lead screw through a differential gear 45 so that the lead screw can be driven by either motor. The lead screw 42 is mounted in a fixed part of the chart position display apparatus and on the fixed part of the apparatus there is provided a series of markings 46 which are traversed by a set of photo-cells 47 carried on the carriage 41. The markings 46 are of any convenient kind which can be sensed optically by the photo-cells. It may be more convenient for the control of the lead screw 42 to use brushes moving over fixed contacts instead of having photo-cells for optical sensing thereby obviating any need for photo-cells and associated amplifiers. In the following description, for convenience however reference will be made to an optical sensing system using photo-cells. Although for simplicity in the drawing only three such photo-cells 47 and their co-operating markings are shown, in a typical construction nine photo-cells 47 are provided. These photo-cells 47, when the carriage 41 is in any one position, sense nine digit values defining in a Gray code the position of the carriage. Thus the markings 46 along the length of movement of the photo-cells 47 provide signals at the photo-cells 47 representative in a Gray code of the position of the carriage 41 along the lead screw 42 and hence provide an indication of the transverse position of the stylus 39 across the chart. In the particular construction being described the markings 46 provide unambiguous information, that is to say there is no cyclic repetition across the width of the chart. This requirement is met by making the number of photo-cells such that the number of binary digits can define unambiguously any position across the chart in terms of the smallest required step of movement.

A similar series of markings 48 are provided on the chart strip 37 adjacent the side of the chart 36 these markings 48 co-operating with a number of photo-cells 49 in a mount 50 on a fixed part of the apparatus. Typically on this mount 50 there might be nine photo-cells with a corresponding series of markings to be used for the purpose of providing information representative of the position of the chart strip 37 with respect to the photo-cells 49. In addition, however, the mount 50 carries further photo-cells co-operating with further markings on the strip 37 for providing control information to be described later. The outputs from the photo-cells 47 and 49 are fed by leads 51, 52 into the computer 35 where they are compared respectively with the corresponding co-ordinates of the position information from the radio navigation system. The motor 43 is energised in accordance with any difference in the transverse chart direction to turn the lead screw 42 so as to bring the stylus 39 to the required position. Similarly a direct current electric motor 53 is energised to drive the rollers 38 to move the chart strip to bring the stylus 39 into the required position relative to the chart. The motor 53 is geared to provide a slow speed drive for use when the stylus 39 is following the movements of the aircraft. In addition to the motor 53 for driving the rollers 38 there is a fast drive motor 54 for coarse setting of the chart and for driving the strip 37 to bring a new chart into position. The outputs of the two motors 53, 54 are combined by a differential gear 55 so that the rollers 38 are driven by either motor. Manual controls 56, 57, conveniently spring-loaded push-button controls, are provided for controlling the fast motors 44, 54 to enable the stylus 39 to be set approximately to the required position, when bringing the apparatus into operation. In addition the fast motors, in circumstances to be explained later, may be energised from the computer 35. It will be seen that with this construction the stylus will be automatically positioned at the appropriate position over the chart in accordance with the input information from the radio navigation system. When the apparatus is brought into operation the stylus is brought into any convenient position over the required chart and the automatic control will then serve to position the stylus correctly. Means (not shown) are provided for ensuring that the stylus does not mark the chart when the fast motors 44, 54 are in operation but only when the system is working automatically using the motors 43, 53.

The computing apparatus 35 is illustrated in further detail in FIGURE 3. Before explaining the construction of this apparatus further the form of computation which is employed will be explained. The purpose of the computing apparatus 35 in this particular embodiment is to obtain what may conveniently be termed X and Y co-ordinates, the X being the co-ordinate represented by the movement of the stylus 39 transversely across the chart under the control of lead screw 42 and the Y co-ordinate being the chart movement on the rollers. To get approximate cartesian co-ordinates from hyperbolic co-ordinate information using two hyperbolic co-ordinate values A, B the computing apparatus operates so that $$X = N(S_a K_a A + S_b K_b B)$$

and $$Y = N(S_a K_a A + S_b K_b B)$$

where

N is a constant restricted to one of the values $2^0$, $2^{-1}$, $2^{-2}$, $2^{-3}$, $2^{-4}$ $S_a$ is a constant restricted to one of the values $+1$ or $-1$ $S_b$ is a constant restricted to one of the values $+1$ or $-1$ $K_a$ is a constant restricted to one of the values $0$, $2^0$, $2^{-1}$, $2^{-2}$ $K_b$ is a constant restricted to one of the values $0$, $2^0$, $2^{-1}$, $2^{-2}$ with the additional restriction that at least one of the factors $K_a$ and $K_b$ must be equal to $2^0$.

The stricted numbers of possible values for the various constants N, $K_a$ and $K_b$ have been found to be sufficient in practice to give an adequate approximation to a rectangular cartesian co-ordinate system for avoiding excessive chart distortion. Powers of two are chosen for the constants since multiplication or division by such factors is very readily effected in a binary digital computing system by shifting the point. In order to minimise the amount of equipment, the computation for the X co-ordinate proceeds to a conclusion before that for Y commences. When the latter is completed, the whole cycle starts again.

It should be noted that N, $S_a$, $S_b$, $K_a$ and $K_b$, may all have particular values during the X calculation which are quite independent of the values they take during the Y calculation.

The two values A and B in the expressions for X and Y quoted above are a selected pair of input variables and may be the red, green or purple hyperbolic co-ordinates. The X and Y calculations proceed with separate identities of A and of B, that is to say the X co-ordinates may for example make use of the red and green values as A and B, whilst the Y co-ordinate might make use of the red and purple values as A and B.

For each individual chart, the values of N, $S_a$, $S_b$, $K_a$ and $K_b$, and the identities of A and B to be used during the X calculation must be specified and those to be used during the Y calculation must be independently specified. For this purpose further markings shown in FIGURE 2 at 59 are provided on the chart strip at the top or bottom of the chart. These markings are memorised by the photo-cells 49 as the chart is moved into position and are memorised for the duration of use of the chart. The markings 59 include a control marking which is sensed by one of the photo-cells 49 not used for giving positional information for markings 49 and which provides a control signal indicating that these markings 59 are not Y co-ordinate values but are chart input data and the computing apparatus is responsive to this control signal to feed the output of all the photo-cells 49 to appropriate stores as described later so that the information in respect of the markings 59 is retained appropriately in the computer. Reverting now to the arithmetic employed in the computer, the X calculation proceeds in two stages, referred to as $X_1$ and $X_2$. The X calculation is followed by the Y calculation which is similarly split into $Y_1$ and $Y_2$. During $X_1$ it will derive a value for $L_x$ where $$L_x = N(S_a K_a A + S_b K_b B)$$

During $X_2$ it will derive a value for $E_x$ where $$E_x = L_x - X$$

It is this value $E_x$ which is translated into the voltage analogue form and used as an error signal for the X servo.

During $Y_1$ and $Y_2$ similar procedures derive $E_y$.

The first step in the calculation involves two variables A and B. Each of these is associated with two constants. The two terms $S_a K_a A$ and $S_b K_b B$ must be available to the adder simultaneously. In such circumstances it pays to draw only A from one of the digit discs 21, draw $S_a$ and $K_a$ from a store of chart constants, and apply it all to arithmetic equipment which will derive $S_a K_a A$ and then store the result. Subsequently, the same arithmetic equipment can be used to obtain $S_b K_b B$ and put this straight into an adder whilst simultaneously tipping $S_a K_a A$ out of the store into the adder. This arrangement makes it desirable to include N in each term so that an arithmetic unit is required which can produce $S_a(NK_a)A$ the N and $K_a$ having been previously combined into one contant. This has now reduced to no more than the facilities for drawing on the appropriate one of the three digit discs 21 (or possibly omitting them all of K happens to be zero), shifting the point by a number of places which will be specified by the constant NK, and addressing the result to a store when dealing with A or to an adder when dealing with B.

Because information is drawn from one digit disc at a time, the whole process will involve three steps instead of two. But as the adder is not employed in the first step, and the equipment dealing with NK is not employed in the last step, it becomes possible to make the first step of X overlap the last step of Y. Thus, it is possible to draw on digit disc $A_x$ (the one which A represents for the purpose of the X calculation), during the period of the computer cycle which is known as $Y_2$. There is some Y calculation going on at this time, but this does not affect the X calculation. During $X_1$ information is drawn from digit disc $B_x$. During $X_2$, the X calculation is combined, but also information is drawn from digit disc $A_y$. During $Y_1$ information is drawn from $B_y$, and so on.

The most significant digits of red and green and purple each pass through a diode in the gate 33 and are then joined to a single line to the computer. The 2nd digits are similarly fed to a single line. When the computer requires red, it provides an earth to the digitising discs for red; likewise appropriate earths are provided for green and purple. The information from the digit discs contains 15 digits and this information is fed through a cable 60 (FIGURE 3) to a store 61. The information is stored in Gray code and is maintained so long as an earth is maintained on a control line 62. This earth is obtained from a timing unit comprising of clock pulse generator 63 with a pulse encoder 64 which provides all the necessary timing signals from the computer. The store 61 also incorporates a translator for translating the information from Gray to binary code, this being the translator 34 of FIGURE 2. As will be explained later the store 61 is arranged to feed out the appropriate red, green or purple information as required and also to effect any change of sign if $S_a$ or $S_b$ is −1.

The output from store 61 is fed into a unit 65 which provides a division by eight if required under the control of a control signal on a lead 66 and so passes on either the twelve least or the twelve most significant digits onto a further similar block 67. The division by eight in block 65 is used when coarse control is to be effected with the fast motors 44, 54 and the means for providing the appropriate signal on lead 66 will be described later. The block 67, if required, provides a similar division by eight under the control of a signal on the lead 68 and passes nine digits into block 69. This block 69 is a similar dividing unit but divides by four if required to pass on the seven least or seven most significant digits to block 70. The division by four in the block 69 is under the control of input signal of a lead 71. The block 70 is a similar dividing unit under the control of signals on a lead 72 but divides by two and passes six digits to a gate and store 73. The blocks 67, 69 and 70 effect the required multiplication by the appropriate factors $NK_a$ and $K_b$. The store 73 stores this number from block 70 for future use unless or until an input control signal from the timing unit 64 on a lead 74 is applied, whereupon the information in the store 73 is fed out in parallel form on leads 75 into an adder 76. An input signal from the timing unit 64 on lead 77 to the store 73 routes the information into the adder 76 on a separate set of leads 79. The store 73 is cleared by a clearing signal from the timing unit 64 on a lead 78. The timing control signals are arranged so that $S_aNK_aA$ arrive at the adder 76 on leads 75 at the same time as the signal $S_bNK_bB$ arrives on leads 79 and the adder adds these two signals to produce a seven digit number which is passed to a distributor 80. This distributor provides no outputs until a control signal from the timing unit 64 is applied from the lead 81 and this control signal is timed so that the adder 76 will have finished propagating any "carries" and arrived at the total. Timing signals from the timing unit 64 on leads 82, 83 to the distributor 80 determine whether an X or Y computation is being made and the output is fed out at the end of the first stage ($X_1$ or $Y_1$) of the calculation, that is to say $L_x$ or $L_y$ is fed to a store 84 which is read during the second stage ($X_2$ or $Y_2$) of the calculation, under the control of timing signal from the timing unit 64, and is fed back into the adder 76. The output from the adder passes again to the distributor 80. This output is now $E_x$ or $E_y$ and is fed accordingly to one or other of two units 85, 86 for the X and Y direction respectively. The units 85 and 86 each include a store and a digital-to-analogue convertor in which the information is translated into analogue form such that the magnitude of $E_x$ or $E_y$, regardless of sign, is represented by the voltage on one analogue output line from each unit. There is a separate output line to indicate the sign, that is to say whether the voltage is to be regarded as positive or negative. These outputs represent the errors in the position of the stylus with respect to the chart which have to be corrected. In the particular embodiment being described, the units 85, 86 are arranged also to provide output signals which indicate whether the error is greater than 0, greater than 1 and greater than 15 on three further output leads 87, 88, 89 respectively. The output on lead 87 is used by the stylus inhibiting unit which ensures that the stylus does not mark the chart if any error is present. The other two outputs are used to determine whether the fast motors should be used or not. If the error is greater than 15, the fast motor providing a coarse servo drive is employed and the circuit is not switched back to the slow speed motor until the error is less than 1.

Before discussing further the servo-control system, the means for feeding the stylus and chart position signals into the adder 76 for the second stage of the calculation will be described. The inputs from the photo-cells 47 of FIGURE 2 are fed on lead 51 into a store and Gray-to-binary translator 90 (FIGURE 3). The inputs from the photo-cells 49 on lead 52 are fed into a distributor 91 which normally feeds nine digits into the translator 90. When the chart strip is in a position such that the markings 59 between successive charts are sensed by the photo-cells 49, the distributor 91 under the control of a control signal obtained from these markings 59 feeds the outputs from all the photo-cells 49 into a chart-constant store 92, the purpose of which will be described later. The store and translator 90 under the control of timing signals on lead 93 from the timing unit 64 feeds the nine X and Y stylus and chart position digits separately at the required times to a unit 94 which under the control of a control signal on lead 95 may effect a division of eight so providing a six digit output which is fed into the adder 76. The six most significant digits are used for coarse control whilst the six least significant digits are used for fine control.

Reverting now to the servo-control system, when the error signal $E_x$ or $E_y$ is more than fifteen unit steps the output from the units 85 or 86 as appropriate is fed into a coarse servo control unit 98 and this provides, as hereinafter described, the control signals on leads 66 and 95 for the dividers 65 and 94 so that the computation then proceeds in the coarse mode using the most significant digits instead of the fine mode. The coarse mode operation is held as explained above until the error is not larger than 1 unit step in the coarse mode (which corresponds to 8 unit steps in the fine mode) and then the output signal on the lead 89 then provides the necessary control signal for the coarse servo selector 98 for the switching to fine mode operation. It is desirable that the computer will operate in the coarse mode for a period of time not less than one computer cycle if the chart is moved due to some manual intervention and the chart and stylus manual controls 57 and 56, FIGURE 2, are arranged, when operated, to provide a control signal for a predetermined period, for example two seconds, which is applied to the coarse servo selector unit 98 to ensure this.

Whenever the coarse mode is to be put into operation it is necessary that the output from the coarse servo selector unit 98 is taken as an instruction that the next computation is to be done in the coarse mode and consequently a complete cycle elapses before a new X or Y computation has been completed to provide a value for the error signal in the coarse mode. While waiting for this the existing value of the error signal for the fine mode computation should be actioned by the slow drive motor. The output from the coarse servo selector 98 is therefore fed through a unit 99 containing a delay line having a delay time of precisely one cycle. This is conveniently done by making use of the computer timing, the error signal being shifted from one store to another at the successive periods $Y_1$, $Y_2$, $X_1$ and $X_2$ (or $X_1$, $X_2$, $Y_1$ and $Y_2$). At the end of this delay period the signal operates a relay which switches the output of servo amplifiers 100 or 101 from the slow motor to the fast motor. These amplifiers are responsive to the analogue error signals from the units 85, 86 respectively and provide the power for the drive motors 43, 44 and 53, 54.

The aforementioned store 92 serves to store the various chart constants. The number of chart constants required may be greater than the number of photo-cells 49 and, in FIGURE 2, two sets of markings 59 are shown which are read in succession as the chart strip passes under the photo-cells. These markings provide, via the photo-cells, the necessary control signals for the distributor 91 to route the information from the photo-cells to appropriate storage locations in the store 92. In a typical construction, 24 storage locations for chart constants are provided. The stored information is fed out on separate leads at the appropriate times under the control of timing signals from the timing unit 64 to provide the control signals selecting the patterns to be employed in store 61 and also the various values of $S_a$ and $S_b$ required in that store and also the control signals on leads 68, 71 and 72 to the dividers 67, 69 and 70. The store 92 also provides control signals for an input co-ordinate selector 103 which, under the control of timing pulses from the timing unit 64, controls the selection of the information from the radio navigation system by the gates 30 to 32.

It will be seen that with the above described apparatus, the user can select any required chart on the chart strip by operating the fast manual control 57. When the appropriate chart has appeared in the displayed position, the manual control is released. The operator, if desired, can set the chart and stylus positions approximately to correspond to the position of the aircraft using the manual controls but, as soon as the controls are released, the servo system will automatically drive the stylus in the X direction and the chart in the Y direction to bring the indicated position into correspondence with the information from the radio navigation system. The computing apparatus will, as the chart was moved into the display position, have read and stored all the required information for automatically selecting the appropriate inputs from the radio navigation system and for utilising these to give an approximate cartesian co-ordinate system so avoiding undue distortion of geographical information on the chart. The various charts on a single strip may be drawn to different scales and, if so, the scale information is automatically stored as each chart is moved into position and utilised in controlling the servo system. Thus a chart strip for an aircraft might contain large scale charts of departure and arrival airports and possibly diversionary airports together with smaller scale charts, possibly on two or more different scales, covering the region to be traversed by the aircraft. The display shows aircraft position on the selected chart and, as the aircraft moves out of the coverage of one chart, the operator merely has to operate the manual control until the next required chart appears. It will often be desirable to arrange the charts so that the aircraft position traverses along the length of the strip and, in this case a chart may be made so long that the markings 48 are repeated cyclically along the length of the chart. In this case the operator merely has, when setting the chart in position, to ensure that the chart is set within the appropriate repetition cycle of the markings. The apparatus will then automatically move the stylus and chart to indicate correctly the exact position of the aircraft. The chart strips may be made removable and replaceable so that an appropriate set of charts for any given journey may readily be put into the apparatus.

Although the chart display apparatus has been described more specifically in conjunction with a hyperbolic navigation system, it may be used with any position fixing radio navigation system which can provide output information in digital form.

I claim:

1. Chart position display apparatus comprising a housing, a series of separate charts arranged in a long strip in said housing, drive means for moving said strip in the direction of its length to bring a selected portion of the strip to a viewing position, an indicator mounted in said housing for linear movement transverse to the direction of movement of the chart, first sensing means in said housing and cooperating markings on the chart arranged to provide an electrical signal output in digital form representing the linear position of the chart in the direction in which it is moved, second sensing means and cooperating markings relatively movable in accordance with movement of the indicator in said housing and arranged to provide an electrical signal output in digital form representing the linear position of the indicator, comparison means for comparing the outputs of the two sensing means with input signals representing in digital form the two coordinates of the required position of the indicator relative to the chart, servo means under the control of said comparison means for effecting movement of the indicator and of the chart to bring the relative position of the indicator on the chart to a chart position corresponding to the coordinates represented by said input signals, and further markings on the strip between successive charts arranged to cooperate with said first sensing means, which further markings include control markings arranged, as the chart strip is fed under the first sensing means to bring a selected chart into position, to set into the servo means data relating to the selected chart about to be moved into position.

2. Chart position display apparatus as claimed in claim 1 wherein said first and second sensing means each comprise a plurality of photo-cells cooperating respectively with a series of markings representing the various digits of the coordinate value.

3. Chart position display apparatus as claimed in claim 2 wherein the second sensing means are movable in said housing with said indicator and wherein the markings cooperating with said second sensing means are fixed relative to the housing.

4. Chart position display apparatus for use with a hyperbolic radio navigational system providing positional information with respect to at least two sets of confocal hyperbolae and having computing means for converting the hyperbolic position coordinates into rectangular cartesian coordinates, which display apparatus comprises a housing, a series of separate charts arranged in a long strip in said housing, drive means for moving said strip in the direction of its length to bring a selected portion of the strip to a viewing position, an indicator mounted in said housing for linear movement transverse to the direction of movement of the chart, first sening means in said housing and cooperating markings on the chart arranged to provide an electrical signal output in digital form representing the linear position of the chart in the direction in which it is moved, second sensing means and cooperating markings relatively movable in accordance with movement of the indicator in said housing and arranged to provide an electrical signal output in digital form representing the linear position of the indicator, comparison means for comparing the outputs of the two sensing means with input signals representing in digital form the two coordinates of the required position of the indicator relative to the chart as determined by said computer, drive means under the control of said comparison means for effecting movement of the indicator and of the chart to bring the relative position of the indicator on the chart to a chart position corresponding to the coordinates represented by the input signals from the computer, and further markings on the strip between successive charts arranged to cooperate with said first sensing means, which further markings include control markings arranged, as the chart strip is fed under the first sensing means to bring a selected chart into position, to set into the computer data relative to the selected chart about to be moved into position.

5. Chart position display apparatus as claimed in claim 4 wherein said drive means for each coordinate direction comprise fast and slow drives and wherein, for each coordinate direction, selective means responsive to the outputs of the comparison means are provided arranged to select the fast or slow drive in accordance with the magnitude of output of the comparison means.

References Cited in the file of this patent

UNITED STATES PATENTS

| | | |
|---|---|---|
| 2,530,428 | Gray | Nov. 21, 1950 |
| 2,769,977 | Roberts et al. | Nov. 6, 1956 |
| 2,771,593 | Straehl | Nov. 20, 1956 |

OTHER REFERENCES

"Instruments and Automation," vol. 29, issue 6, pp. 1109–1117, June 1956.